United States Patent
Steinmann et al.

(10) Patent No.: US 7,518,314 B2
(45) Date of Patent: Apr. 14, 2009

(54) RED-COLORED ELECTRIC LAMP

(75) Inventors: Maarten Walter Steinmann, Turnhout (BE); Hubertina Maria Ulenaers, Eindhoven (NL); Simon Krijnen, Eindhoven (NL); Simon Flink, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 450 days.

(21) Appl. No.: 10/533,727

(22) PCT Filed: Oct. 16, 2003

(86) PCT No.: PCT/IB03/04580

§ 371 (c)(1),
(2), (4) Date: May 3, 2005

(87) PCT Pub. No.: WO2004/041739

PCT Pub. Date: May 21, 2004

(65) Prior Publication Data

US 2006/0033440 A1 Feb. 16, 2006

(30) Foreign Application Priority Data

Nov. 6, 2002 (EP) .................... 02292767

(51) Int. Cl.
*H01J 17/16* (2006.01)

(52) U.S. Cl. .................... 313/636; 501/32; 501/55

(58) Field of Classification Search ............... 439/611; 313/636
See application file for complete search history.

(56) References Cited

U.S. PATENT DOCUMENTS

| | | | | |
|---|---|---|---|---|
| 2,440,048 A | * | 4/1948 | Hood | 252/301.4 F |
| 2,515,939 A | * | 7/1950 | Stookey | 430/13 |
| 5,932,501 A | * | 8/1999 | Brocheton | 501/64 |
| 6,764,328 B2 | * | 7/2004 | Van Dulmen et al. | 439/226 |
| 6,846,760 B2 | * | 1/2005 | Siebers et al. | 501/32 |
| 2001/0013748 A1 | * | 8/2001 | Ishihara | 313/318.09 |
| 2003/0087746 A1 | * | 5/2003 | Ritter et al. | 501/66 |

FOREIGN PATENT DOCUMENTS

| | | | |
|---|---|---|---|
| DE | 10005088 C1 | * | 3/2001 |
| DE | 10053450 A1 | | 5/2002 |
| EP | 0603933 A1 | | 6/1994 |
| EP | 0603933 B1 | | 6/1994 |
| ES | 2081249 A1 | | 2/1996 |
| WO | WO 0156941 | * | 8/2001 |
| WO | WO0246116 A1 | | 6/2002 |

* cited by examiner

*Primary Examiner*—Peter J Macchiarolo
*Assistant Examiner*—Donald L Raleigh

(57) ABSTRACT

The invention relates to electric lamps and more particularly to automotive signal lamps. A glass composition is described for use in electric lamps, which glass is red colored. The glass composition comprises copper between 0.1 and 2% by weight, tin between 0.1 and 2% by weight, barium between 7 and 11% by weight, and strontium between 1 and 5% by weight.

6 Claims, 2 Drawing Sheets

RED-COLORED ELECTRIC LAMP

FIELD OF THE INVENTION

The present invention relates to electric lamps. In particular the invention relates to an electric lamp having a glass envelope, the glass being red colored. The invention applies to incandescent lamps and more particularly to automotive signal lamps, e.g. indicator lamps.

BACKGROUND OF THE INVENTION

Automotive signal lamps must have specific colors defined by international traffic regulations. For example, automotive signalling functions like tail, stop, or fog lighting require red lamps. In order to obtain the red color as defined by international traffic regulations, prior-art lamps are usually coated with a red varnish or lacquer. A disadvantage of the prior-art lamps is that the lacquer or varnish may degrade and may eventually peel off from the wall of the lamp envelope. Actually, these red coatings usually consist of vulnerable constituents that have a relative low thermal resistance. Another disadvantage of the prior-art lamps is that additional steps are necessary during the manufacturing process of the lamp for cleaning and varnishing the lamp envelope. The manufacturing cost is increased by these additional steps.

SUMMARY OF THE INVENTION

It is an object of the invention to provide an electric lamp suitable for automotive applications, said lamp having a glass envelope, the glass being red colored.

According to the invention, these objects are achieved by an electric lamp as mentioned in the opening paragraph, the glass composition comprising copper between 0.1 and 2% by weight, tin between 0.1 and 2% by weight, barium between 7 and 11% by weight, and strontium between 1 and 5% by weight.

No additional manufacturing step is necessary during the production of an electric lamp according to the invention, since the specific color point of the glass envelope is realized by the particular composition of the glass. At least, the steps of cleaning and varnishing are suppressed. Due to its specific composition, the glass may have a red color point suitable for automotive signal lamps, as defined by international traffic regulations.

Moreover, the colored glass obtained in accordance with this glass composition yields a better quality glass, since the obtained red color inherent in the glass composition stays forever, which may not be the case of varnished glasses. Actually, the use of barium and strontium lowers the ion conductivity of the glass, which results in a thermostable color of the glass at lamp operating temperatures.

Furthermore, such a glass is particularly suitable for automotive signal lamps, because the presence of barium increases the electrical resistivity of the glass, which is required for the electrical feed-through.

In an advantageous embodiment, the glass composition comprises the following constituents, expressed in percentages by weight:

| | |
|---|---|
| $SiO_2$ | 60-72 |
| $Al_2O_3$ | 1-5 |
| $Li_2O$ | 0.5-1.5 |
| $Na_2O$ | 5-9 |
| $K_2O$ | 3-7 |
| MgO | 1-2 |
| CaO | 1-3 |
| SrO | 1-5 |
| BaO | 7-11 |
| CuO | 0.1-2 |
| $SnO_2$ | 0.1-2 |

The $SiO_2$ content is limited to 60-72%. These contents, in combination with the other constituents, lead to a readily meltable glass. $Al_2O_3$ improves the chemical resistance and the corrosion resistance of the glass. The alkaline metal oxides $Li_2O$, $Na_2O$, and $K_2O$ are used as melting agents and reduce the viscosity of the glass. MgO and CaO reduce the liquefying temperature and the melting temperature of the glass. Such a glass is lead-free, cadmium-free, and selenium-free, which elements are harmful for the environment.

The invention and additional features, which may be optionally used to implement the invention, are apparent from and will be elucidated with reference to the drawings described hereinafter.

BRIEF DESCRIPTION OF THE DRAWINGS

The invention will now be described in more detail, by way of example, with reference to the accompanying drawings, in which.

DETAILED DESCRIPTION OF THE INVENTION

Figure 1:
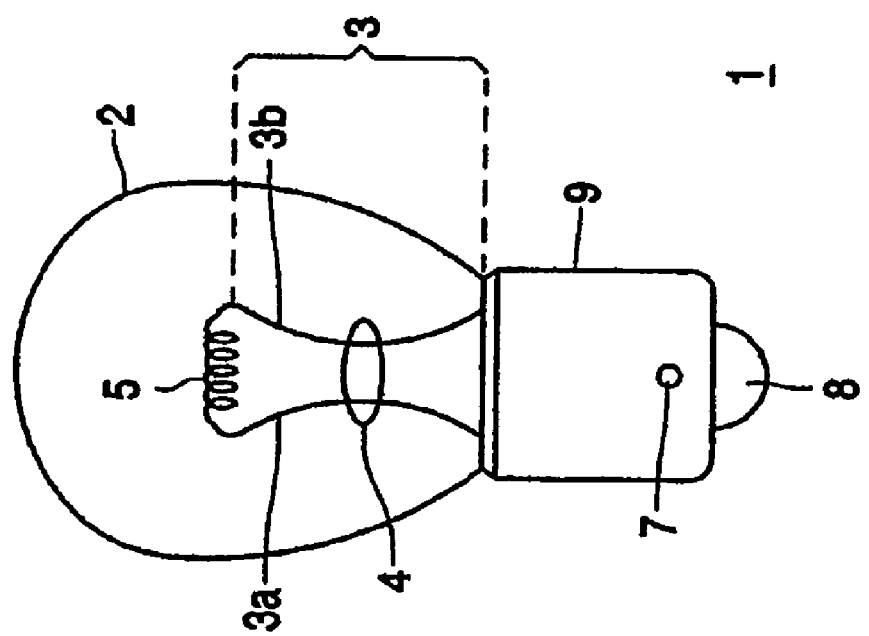
FIG. 1 is a schematic chart illustrating an example of an electric lamp according to the invention.

FIG. 1 shows an electric automotive signal lamp 1, also denoted indicator lamp, comprising:

- a lamp envelope or bulb 2 made from red colored glass, having a wall thickness comprised between, for example, 0.3 mm and 1.1 mm,
- a mount 3 comprising two lead wires 3a and 3b held by a bead 4 mounted inside the glass bulb 2 for supporting a coiled filament 5,
- an exhaust tube 7, heated and sealed up with the mount 3 and the bulb 2, thereby forming a vacuum-tight pinch for exhausting gases from the lamp envelope 2 and for introducing inert gas into the lamp envelope during the manufacturing process of the lamp,
- an electric contact 8 connected to, the mount 3 for the lamp to be electrically supplied by the electric circuits of the car,
- a metal cap 9 to fit in a holder of the lamp set.

In an advantageous embodiment of the invention, the starting materials for making the glass are quartz sand, spodumene, dolomite, the carbonates of Li, Na, K, Sr, and Ba, CuO and $SnO_2$.

An electric lamp in accordance with an advantageous embodiment of the invention has a glass bulb with a glass composition comprising the constituents as listed in Table 1.

TABLE 1 glass composition according to
an advantageous embodiment of the invention.

| Constituent | Composition (% by weight) |
|---|---|
| $SiO_2$ | 60-72 |
| $Al_2O_3$ | 1-5 |
| $Li_2O$ | 0.5-1.5 |
| $Na_2O$ | 5-9 |
| $K_2O$ | 3-7 |
| MgO | 1-2 |
| CaO | 1-3 |
| SrO | 1-5 |
| BaO | 7-11 |
| CuO | 0.1-2 |
| $SnO_2$ | 0.1-2 |

In this table, the percentages by weight of the oxidic forms of the constituents are given. This does not necessary imply that these elements are present in the glass in this oxidic form. For example, copper in the glass might be present as metallic Cu, $Cu^+$, CuO, or other forms of copper. As a consequence, expressions like "the glass composition comprises element X between α and β% by weight" mean that all the forms of element X comprised in the glass composition account for a percentage between α and β% by weight.

$SiO_2$ serves as a network former in the glass. The $SiO_2$ content is limited to 60-72% by weight, leading to a readily meltable glass in combination with the other constituents. If the content is below 60% by weight, the cohesion of the glass and the chemical resistance are reduced. If the content is above 72% by weight, the glass formation is impeded and the risk of surface crystallization increases. $Al_2O_3$ improves the chemical resistance and the corrosion resistance of the glass. Below 1% by weight the effect is too small and the crystallization tendency of the glass increases. Above 5% by weight the viscosity and the softening temperature of the glass increase too much, which affects the workability of the glass. The alkaline metal oxides $Li_2O$, $Na_2O$, and $K_2O$ are used as melting agents and reduce the viscosity of the glass. They increase the electrical resistance of the glass (mixed-alkali effect). BaO has the favorable property that it increases the electrical resistance of the glass and reduces the softening temperature of the glass. Below 7% by weight, the melting temperature, the softening temperature, and the working temperature increase too much. Above 11% by weight, the liquidus temperature and hence the crystallization tendency increase too much. The alkaline-earth metal oxides SrO, MgO, and CaO have the favorable property that they reduce the liquefying temperature and the melting temperature of the glass.

The glass may additionally contain some $Fe_2O_3$ as an impurity originating from the raw materials used. Also $TiO_2$, $ZrO_2$, and MnO may be found as trace elements.

The red color of the glass according to the invention is obtained by adding between 0.1 and 2% by weight of CuO and a reducing agent, e.g. carbone or charcoal, in the glass composition. $SnO_2$ is also added in the glass composition.

In the presence of a reducing agent and $SnO_2$, copper colors silicate glasses red, which is explained by the possible precipitation of Cu in metallic form, as will be described hereinafter.

An electric lamp in accordance with another embodiment of the invention has a glass bulb with a glass composition comprising the constituents as listed in Table 2.

TABLE 2 glass composition according to another embodiment of the invention.

| Constituent | Composition (% by weight) |
|---|---|
| $SiO_2$ | 60-72 |
| $Al_2O_3$ | 1-5 |
| $Li_2O$ | 0.5-1.5 |
| $Na_2O$ | 5-9 |
| $K_2O$ | 3-7 |
| MgO | 1-2 |
| CaO | 1-3 |
| SrO | 1-5 |
| BaO | 7-11 |
| CuO | 0.6-0.9 |
| $SnO_2$ | 0.3-1.8 |
| $Fe_2O_3$ | 0-0.05 |

With respect to the element whose weight percentage has a lower limit equal to zero, it means that the element must not be added as a raw material may but yet be present in the finished glass as a result of contamination of the raw materials.

The glasses made with the constituents as listed in Table 1 or 2 have characteristics as shown in Table 3.

TABLE 3

Physical properties of the glass according to the invention.

| Physical property | Value |
|---|---|
| $T_{strain}$ (low stress relief temperature) | 455° C. |
| $T_{anneal}$ (high stress relief temperature) | 490° C. |
| $T_{soft}$ (softening temperature) | 675° C. |
| $T_{melt}$ (melting temperature) | 1490° C. |
| Specific mass | $2.62 * 10^3$ kg·m$^3$ |
| Specific resistance | $7.9 * 10^6$ Ω·m |
| Linear expansion coefficient (25-300° C.) | $9.1 * 10^{-6}$/° C. |

The glass-making process will now be described below. A batch is prepared by weighing and mixing all oxidic components mentioned above. The batch is fed to a conventional continuous melting tank. Adjustments of the recipe can be made by adding separate ingredients in the feeding system for enhancing the coloring. The melting conditions, including temperature and gas atmosphere, are adjusted to obtain a stable processing for melting, refining, and color stabilization.

In a series of complex reactions, the excess gases, including CO, are removed from the glass melt to avoid air lines in the formed tubes. Glass tubes are made at the end of the glass manufacturing process using the well-known Danner process in the factory. However, the well-known Vello process could also be applied. Part of the tube is heated to make lamp bulbs.

The striking of the glass may be explained by the presence of metallic Cu in crystals of colloidal size, in equilibrium with $Cu^+$. Furthermore, it appears that striking requires a certain degree of nucleation, which is why $SnO_2$ is added. Cu is introduced in the form of the oxide in combination with a reducing agent. In this example, the reducing agent is carbon, but any other reducing agent could be used, including Al and Si. Suitable time and temperature of striking, which depend on the basic composition, are best determined in a gradient furnace. For example, a striking temperature between 500 and 550° C. might be used. The time of striking might be between 0.5 and 3 hours.

Copper is introduced as CuO in a percentage comprised between 0.1 and 2% by weight. Larger amounts of copper are harmful, as they decrease transmissivity in the red region. Lower concentrations do not produce coloring. Under reducing conditions, an equilibrium is obtained between $Cu^{2+}$, $Cu^+$ and Cu. When sufficient $Cu^+$ ions are present in the glass, the concentration of Cu in equilibrium with $Cu^+$ exceeds the solubility limits and Cu is precipitated. The red color is obtained by colloidally dispersed Cu particles in equilibrium with $Cu^+$, when the bivalent copper has disappeared. The reducing element should therefore be able to reduce all $Cu^{2+}$. In this example, the reducing element C is chosen in a proportion C/Cu=1.67.

The function of tin may be that of a metallophilic element. As soon as a nucleus of a Cu crystal has formed, it selectively attracts the $Sn^{2+}$ ions, which form an efficient barrier against further growth of the metal crystal and thus stabilizes the colloidal dispersion of the Cu and prevents further growth of the Cu atom aggregates and their overstriking.

Figure 2:
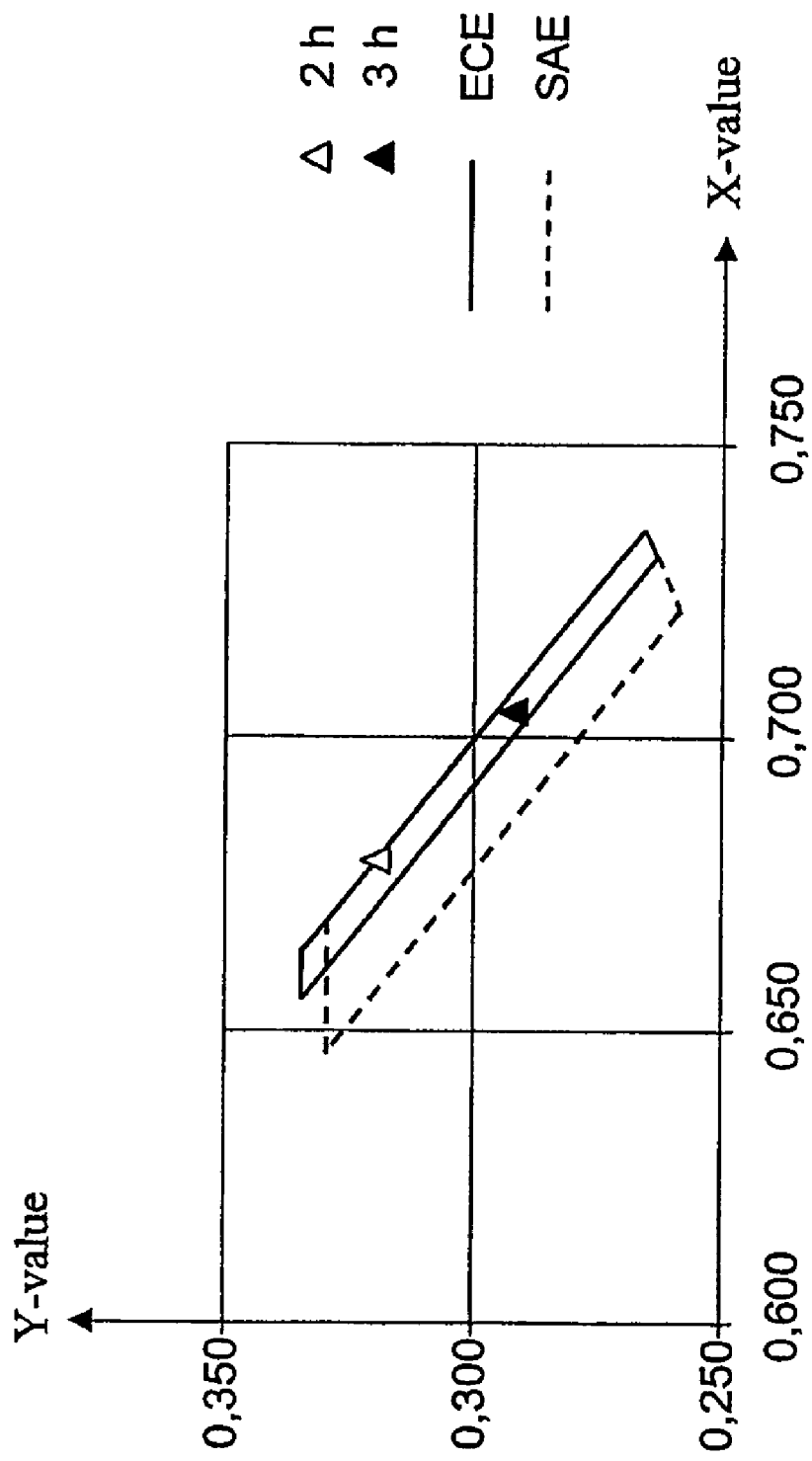
FIG. 2 is a chromaticity diagram showing the characteristics in the color triangle of red colored glasses according to the invention.

FIG. 2 shows a variety of color points of red colored glass for use in the glass envelope of signal lamps in accordance with international traffic regulations, with respect to X and Y co-ordinates in the chromaticity chart. This color point may be achieved with the glass composition in accordance with the invention described above. It is noted that the exact composition of the glass which gives the color point depends on the production of the glass, particularly the reducing state, and on the curing after bulb blowing.

In Europe, a red color point for automotive indicator lamps is defined by the BCE regulation, known to those skilled in the art. It corresponds to the area shown in continuous lines of FIG. 2. The red ECE-region is defined by the following color coordinates: (0.657, 0.335); (0.665, 0.335); (0.732, 0.27); (0.728, 0.27).

The SAE (Society of Automotive Engineers) has proposed another region, which is defined by the following color coordinates: (0.65, 0.33); (0.67, 0.33); (0.7367, 0.2653); (0.7164, 0.2636). This region is shown in dotted lines on FIG. 2.

The GTB (Groupe de Travail de Bruxelles) commission has proposed a new, larger area which encloses both the current ECE and SAE color boundaries. This is known as the CIE-region.

The triangles in the chart of FIG. 2 show the color points obtained with a glass of 0.5 mm thickness comprising 0.9% by weight of copper, 0.6% by weight of tin, 9.0% by weight of barium, and 3.0% by weight of strontium. The striking temperature is 540° C. The results are given for striking times of 2 and 3 hours.

The drawings and their description hereinbefore illustrate rather than limit the invention. It will be evident that there are numerous alternatives which fall within the scope of the appended claims. In this respect, the following closing remark is made.

The word "comprising" does not exclude the presence of other elements than those listed in a claim. The word "a" or "an" preceding an element does not exclude the presence of a plurality of such elements.

The invention claimed is

1. An electric automotive signal lamp having a glass envelope, the glass being red colored, the glass composition comprising copper between 0.1 and 2% by weight, tin between 0.1 and 2% by weight, barium between 7 and 11% by weight, and strontium between 1 and 5% by weight, wherein the glass composition, expressed in percents by weight of the oxidic forms of the constituents, comprises:

| | |
|---|---|
| $SiO_2$ | 60-72 |
| $Al_2O_3$ | 1-5 |
| $Li_2O$ | 0.5-1.5 |
| $Na_2O$ | 5-9 |
| $K_2O$ | 3-7 |
| MgO | 1-2 |
| CaO | 1-3 |
| SrO | 1-5. |

2. An electric automotive signal lamp having a glass envelope, the glass being red colored, the glass composition comprising copper between 0.1 and 2% by weight, tin between 0.1 and 2% by weight, barium between 7 and 11% by weight, and strontium between 1 and 5% by weight, from a trace amount up to 0.05 percent by weight of the oxidic form of $Fe_2O_3$ wherein the glass composition, expressed in percents by weight of the oxidic forms of the constituents, comprises:

| | |
|---|---|
| $SiO_2$ | 60-72 |
| $Al_2O_3$ | 1-5 |
| $Li_2O$ | 0.5-1.5 |
| $Na_2O$ | 5-9 |
| $K_2O$ | 3-7 |
| MgO | 1-2 |
| CaO | 1-3 |
| SrO | 1-5 |
| BaO | 7-11 |
| CuO | 0.1-2 |
| $SnO_2$ | 0.1-2. |

3. An electric automotive signal lamp having a glass envelope. the glass being red colored, the glass composition comprising copper between 0.1 and 2% by weight, tin between 0.1 and 2% by weight, barium between 7 and 11% by weight, and strontium between 1 and 5% by weight, wherein the glass composition, expressed in percents by weight of the oxidic forms of the constituents, comprises:

| | |
|---|---|
| $SiO_2$ | 60-72 |
| $Al_2O_3$ | 1-5 |
| $Li_2O$ | 0.5-1.5 |
| $Na_2O$ | 5-9 |
| $K_2O$ | 3-7 |
| MgO | 1-2 |
| CaO | 1-3 |
| SrO | 1-5 |
| BaO | 7-11 |
| CuO | 0.6-0.9 |
| $SnO_2$ | 0.3-1.8. |

4. The electric lamp as claimed in claim 1, wherein the glass composition comprises between 0.6-0.9 percent by weight of the oxidic form of CuO.

5. The electric lamp as claimed in claim 1, wherein the glass composition comprises between 0.3-1.8 percent by weight of the oxidic form of $SnO_2$.

6. The electric lamp as claimed in claim 3, wherein the glass composition comprises from a trace amount up to 0.05 percent by weight of the oxidic form of $Fe_2O_3$.

* * * * *